(12) United States Patent
Carson et al.

(10) Patent No.: US 7,106,178 B1
(45) Date of Patent: Sep. 12, 2006

(54) MODULATING THE ELECTRIC FIELD OF A POWER TRANSMISSION LINE

(75) Inventors: Anthony R. Carson, Amber, OK (US); Richard M. Peterson, Jr., Stillwater, OK (US); Michael T. Collins, Stillwater, OK (US)

(73) Assignee: Powermedia & Communications, Inc., Tyler, TX (US)

( * ) Notice: Subject to any disclaimer, the term of this patent is extended or adjusted under 35 U.S.C. 154(b) by 293 days.

(21) Appl. No.: 10/723,356

(22) Filed: Nov. 26, 2003

Related U.S. Application Data

(60) Provisional application No. 60/429,324, filed on Nov. 27, 2002.

(51) Int. Cl.
*G05B 11/01* (2006.01)
(52) U.S. Cl. ............................ 340/310.12; 340/310.11
(58) Field of Classification Search ...............
340/310.01–310.05, 310.12, 310.11; 455/402
See application file for complete search history.

(56) References Cited

U.S. PATENT DOCUMENTS

| 5,982,276 A | 11/1999 | Stewart ................. 340/310.01 |
| 6,281,784 B1 | 8/2001 | Redgate et al. ......... 340/310.01 |
| 2004/0054425 A1 | 3/2004 | Elmore .......................... 700/1 |

OTHER PUBLICATIONS

*The Magnetron Tube Structure and Operation*, Copyright 1989-2001 by J. Carlton Gallawa, http://www.gallawa.com/microtech/magnetron.html, pp. 1-3.
Ceramic Substrates and Components Ltd, *Machinable Glass Ceramic*, http://www.ceramic-substrates.co.uk/macor.htm, Copyright 2003, pp. 1-2.

*Primary Examiner*—Donnie L. Crosland
(74) *Attorney, Agent, or Firm*—Fish & Richardson P.C.

(57) ABSTRACT

A system and method for transmitting data on a power transmission line transmits power in the form of time-varying voltage and current. Data is transmitted by using micro electromagnetic pulses to modulate the electric field, which is present around the power transmission line as a result of the time-varying current.

23 Claims, 5 Drawing Sheets

MODULATING THE ELECTRIC FIELD OF A POWER TRANSMISSION LINE

CROSS-REFERENCE TO RELATED APPLICATIONS

This application is related to co-pending provisional application Ser. No. 60/429,324, filed Nov. 27, 2002, which is incorporated herein by reference.

TECHNICAL FIELD

This description relates to communication networks, and more particularly to the use of power transmission networks for transmitting information in addition to power.

BACKGROUND

Conventional rural power transmission networks provide electrical power through high voltage power transmission lines, which are mostly Aluminum Core Steel Reinforced (ACSR) lines. Power transmission lines normally leave a power station and connect to substations in outlying rural areas. These lines typically carry a distribution voltage of 360 KV. At the sub-stations, a power transformer is used to step down the distribution voltage to 7620 V. Lines from the sub-stations go to communities or homes, where the voltage is further reduced by another power transformer, usually to 240 V single-phase.

The power is transmitted in the form of time-varying voltage and current. The time-varying current flowing through a power transmission line causes electromagnetic radiation to emanate from the line. The radiating electromagnetic radiation produced by the motion of electrically charged particles includes an electric field component and a magnetic field component that are interdependent, with a change in one accompanied by a change in the other. This relationship is governed by Maxwell's equations.

SUMMARY

Data is transmitted on a power transmission line using electromagnetic pulses to modulate the electric field present around the power transmission line due to the time-varying current carried by the power transmission line as it transmits electric power.

In one general aspect, data is transmitted in a power transmission network that has one or more power transmission lines. Each power transmission line carries power in the form of time-varying voltage and current, which results in interdependent electric and magnetic field components. Data is transmitted on the power transmission line using micro electromagnetic pulses to modulate the electric field component according to the data.

Implementations may include one or more of the following features. Transmitting data is performed using a data signal generator to generate the data and a micro electromagnetic pulse generator that generates micro electromagnetic pulses in accordance with the data to be transmitted. The electromagnetic pulse generator is a tripler circuit. A shunt coil can be connected to an output of the tripler circuit. The shunt coil can be wrapped around a magnetic field directionalizer. The magnetic field directionalizer includes a first set of washers made of a non-conducting and non-magnetizing material, a second set of washers made of a ferroelectric material, and a rod made of material that acts as a magnetic propagator insulator. Washers in the first set of washers are interspersed with washers in the second set of washers on the rod. The shunt coil and a portion of the transmission line can be disposed within a metallic tube with a polished inner surface.

A magnetic field directionalizer can be coupled to the micro electromagnetic pulse generator. The magnetic field directionalizer is adapted to induce a polarization leap in the magnetic field component to modulate the electric field component. A collimator can be adapted to focus the polarization leap in the magnetic field component on an area near the power transmission line. A change in the electric field surrounding the power transmission line caused by the polarization leap can be detected. The change in the electric field is detected at a remote location from a location where the electromagnetic pulse is applied, which can be at least a mile from the location where the electromagnetic pulse is applied. The electromagnetic pulse can be applied to create a directional rise in the magnetic field.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
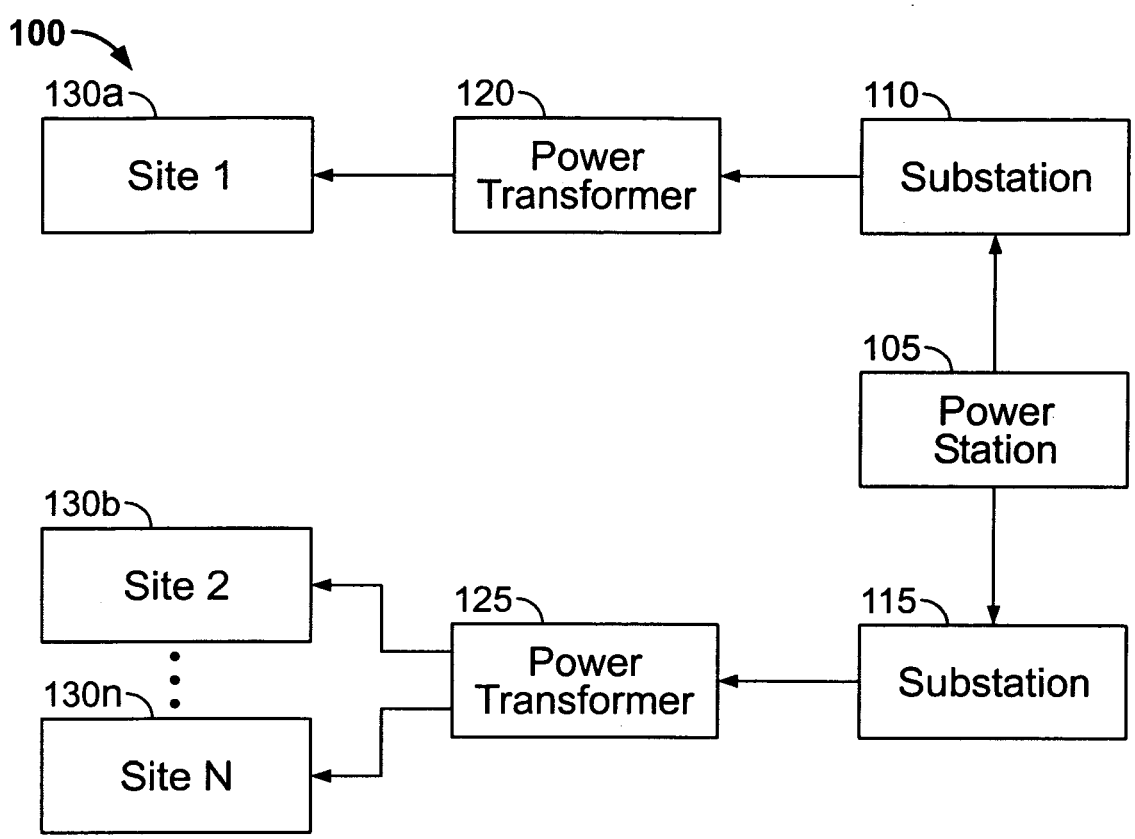
FIG. 1 shows a block diagram of an exemplary power transmission network for distributing electrical power to different sites through power transmission lines.

FIG. 1 shows a block diagram of an exemplary power transmission network 100 for distributing electrical power to different sites through power transmission lines. In the exemplary distribution network 100, power is distributed from a power station 105 to different sites 130*a*–130*n*. Each of the sites 130*a*–130*n* has electrical equipment that receives electrical power from the transmission lines. Transmission lines transmit power between the power station 105 and the electrical substations 110 and 115. The electrical power is transmitted in the form of time-varying voltage and current. At the substations 110 and 115, the distribution voltage is stepped-down. Transmission lines then transmit the power from the substations 110 and 115 to power transformers 120 and 125. At the power transformers 120 and 125, the distribution voltage is again stepped-down, and power is provided to the sites 130*a*–130*n* for consumption by the electrical devices at the sites 130*a*–130*n*.

As described above, the time-varying current sets up interdependent electric and magnetic fields around the transmission lines. Generally, as the load on the transmission lines increases, the current increases, resulting in an increase of the electric field, and vice versa.

The system and techniques described below provide an architecture and related process for supporting a distribution of data, such as for use in telecommunications, broadcast audio and/or video, and the like, across power lines. Data is communicated across long distances by altering the electric field around a power line that is created by the current passing through the power line. The electric field can be modulated at a transmitting end, which may be anywhere along the power line, for demodulation at a receiving end without significantly affecting the current or voltage on the power line conductor at the receiving end. Using the described systems and techniques, the alterations to the electric field are capable of traveling a substantial distance without significantly tapering off. It is possible, for example, to transmit data greater than a mile or even several miles.

Figure 2:
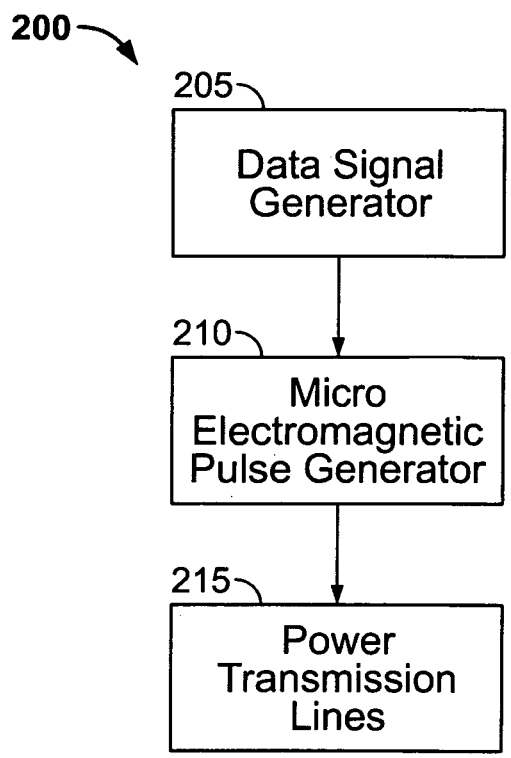
FIG. 2 shows a block diagram of a general system to transmit information via power transmission lines by modulating the electrical field component of the electromagnetic radiation surrounding the line.

FIG. 2 shows a block diagram of a general system 200 to transmit information using a power transmission line by modulating an electric field surrounding the line. The system 200 generally comprises a data signal generator 205 that generates the data to be transmitted. The data signal generator can be, for example, a microcontroller, a general-purpose computer, a digital signal processor, a FPGA, or an ASIC. A micro electromagnetic pulse (EMP) generator 210 is controlled to generate electromagnetic pulses in accordance with the data. An EMP is a short-duration burst of electromagnetic energy. An EMP creates a shockwave of magnetic flux that will induce currents in any conductors in its path. However, the induced currents are relatively small compared to the effect on the electric field. The magnetic flux of the generated micro EMPs is used to invoke a change in the electric field surrounding the power transmission line 215, thereby modulating the field according to the data. Thus, data is transmitted on the power transmission line 215 by using micro EMPs to modulate the electric field component according to the data.

Figure 3:
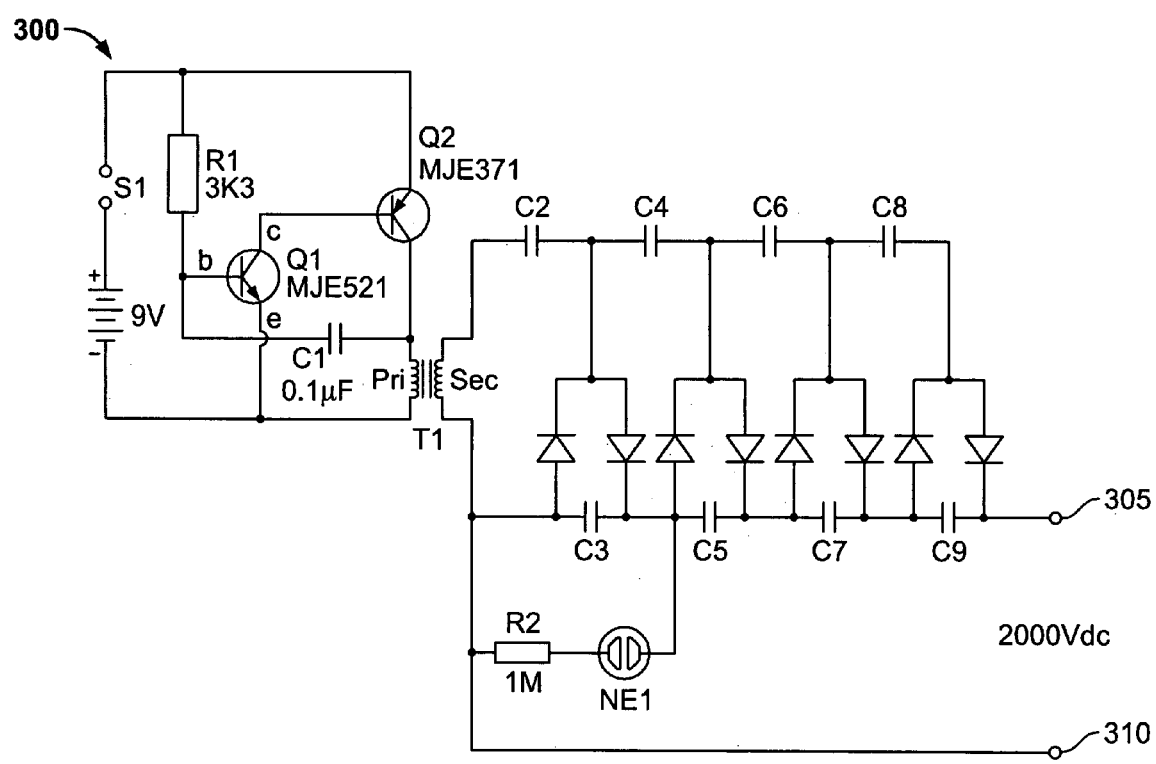
FIGS. 3–5 illustrate circuitry for one implementation of the system of FIG. 2.
Figure 4:
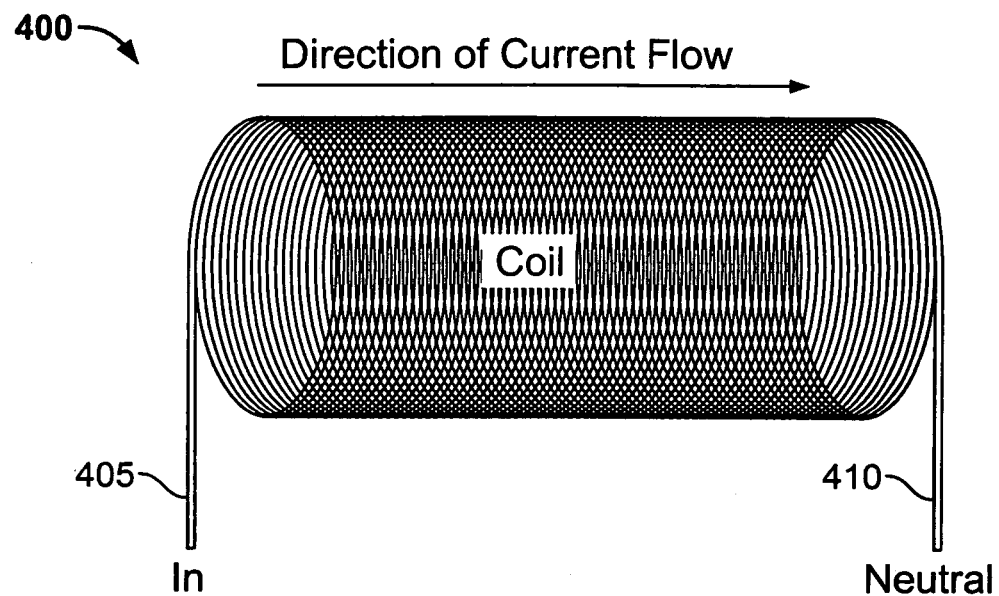
Figure 5:
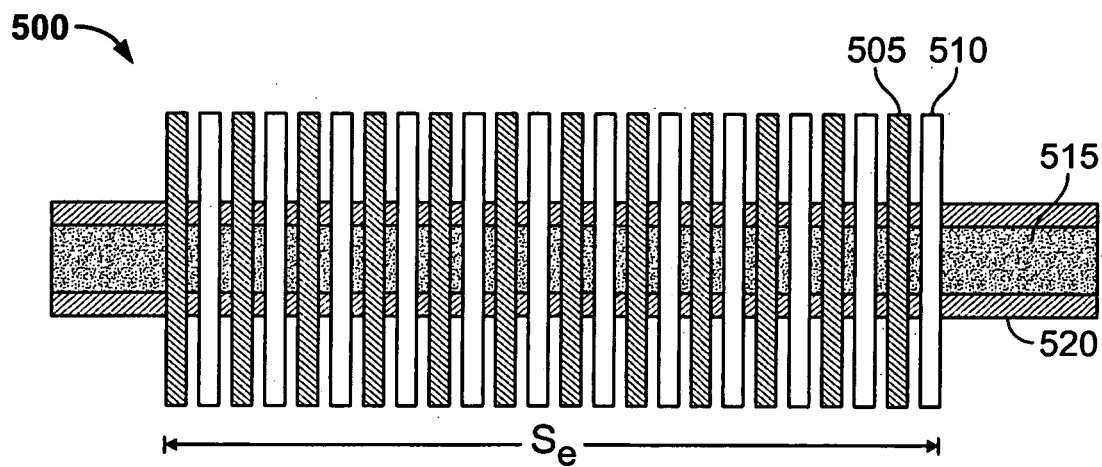

FIGS. 3–5 illustrate circuitry for one implementation of the system 200. FIG. 3 illustrates a circuit 300 for generating the micro EMPs. The circuit 300 is a so-called Jacob's Ladder Circuit, otherwise known as tripler circuit. The circuit 300 takes a voltage and multiplies it by the number of step circuits in the design. The exemplary circuit 300 has the following components:

a resistor R1=3.3 kiloohms, 5%
a resistor R2=1 megaohms, 5%
a capacitor C1=0.1 µF, monolithic capacitor
capacitors C2–C9=0.01 µF, 400 volt, polyester capacitors
diodes D1–D8=1N4007, 1 KV diodes
neon bulb NE1=Type NE-2 neon bulb
power transistor Q1=MJE521 NPN power transistor
power transistor Q2=MJE371 PNP power transistor
power transformer T1=1200 to 8 ohm audio power transformer
switch S1=SPST Connects to Timer QNiFe contactors A timed, binary data signal with high and low levels is used to open and close switch S1. For example, the data signal can be used to control an output trigger of a Triac (e.g., a 6 Amp, 600 V Triac) or MosFet, which ultimately controls switch S1. In one such implementation, the data signal is connected to a PNP transistor base. The PNP transistor collector samples a signal, such as a 12 V signal, to the gate of the Triac or MosFet when the data signal is high. This results in an output signal from the Triac or MosFet that closes a relay (e.g., a 30 amp relay) connected to switch S1. This causes switch S1 to close. Conversely, when the data signal is low, the relay opens, causing switch S1 to open.

When switch S1 is closed, two power transistors Q1 and Q2 form a regenerative amplifier operating as a power oscillator. When Q1 turns on, Q2 turns on, which shorts the power supply across the primary of transformer T1. That current pulse induces a high voltage in the secondary winding of transformer T1. As C1 charges, Q1 turns on again and the cycle repeats itself. As a result, a rapid series of DC pulses are generated and stepped up by transformer T1 (approximately 300 volts at full battery charge for the component values shown). That voltage is rectified and increased by the voltage multiplier section, which includes capacitors C2 to C9 and diodes D1 to D8. The final output for the component values shown is approximately 2000 volts on the positive output 305 relative to ground 310 (i.e., neutral). A neon bulb NE1 is used as a charge indicator and indicates that the unit is charged and operating properly.

Thus, a high signal causes a micro EMP to be generated. A tripler circuit has been shown for generating a micro EMP. However, any number of other devices, such as a High Energy Pulse Radio Frequency Emitter, can be used by one of skill in the art to generate a micro EMP for use in modulating the electric field component of a power transmission line.

The micro EMP generated by the circuit 300 is shunted to ground via a shunt coil 400 (shown in FIG. 4). The shunt coil 400 is made from, for example, fenolic coated wire. One end 405 of the coil 400 is connected to the positive output of the tripler circuit 300 (i.e., positive output 305). The other end 410 is connected to ground (i.e., ground 310).

The shunt coil 400 is wrapped around a magnetic field directionalizer, such as a magnetron head 500 as shown in FIG. 5. The magnetron head 500 includes n washers 505 made of a ferroelectric material (e.g., iron (Fe)) separated by a spacing h. Washers 505 are spaced apart by intervening washers 510 made of non-conducting and non-magnetizing material (e.g., Nylon). The washers 505 and 510 are alternately placed next to one another on an insulator 520 of the magnetic field propagator 515 (i.e., the power transmission line). In one possible implementation, the insulator 520 is a rod of MACOR. As will be appreciated by one of skill in the art, however, any ceramic or plastic insulator will serve as an insulator 520 of the magnetic field propagator 515. The insulator 520 completely surrounds the magnetic field propagator 515, although in the illustrated example the insulator 520 is shown in cross-section to expose the magnetic field propagator 515.

As the micro EMP charges the shunt coil 400, a change in the magnetic field rises in the back (i.e., left side in this illustration) of the magnetron head 500. This change can be represented by:

$$i_e = n\Delta P u_e \frac{S_e}{\delta} \text{ for } t_e \le t \le t_e + \delta u_e^{-1} \text{ and}$$

$$i_e = 0 \text{ for } t < t_e \text{ or } t > t_e + \delta u_e^{-1}$$

where: $S_e$ is the contact surfaces square, n is the number of ferroelectric plates/washers, $u_e$ is the speed of the shock wave (i.e., the EMP) in ferroelectric matter, and $\Delta P$ is the polarization leap at the shock wave front. The distance $\delta$ represents the length of shock wave motion through the shunt coil 400. In axial case $\delta$=nh, where h is the distance between the metallized sides of the plates/washers 505. In the longitudinal case the value δ is equal to the shock wave way length through the shunt coil 400. The representation can be used either in the case when the polarization vector and the direction of shock wave movement are parallel, or in the case when they are perpendicular.

The charge in the front of the micro EMP induces a polarization leap of the magnetic field from the rear (i.e., the left end 405) of the shunt coil 400 to the front (i.e., the right end 410) of the shunt coil 400. A magnetic field collimator (not shown) is used to focus the magnetic field on the power transmission line. An aluminum tube polished in the interior to a mirror finish can be used as a collimator. In this case, at least a portion of the power transmission line and the magnetron head 500 with the shunt coil 400 is housed in the cylinder.

The magnetic pulse from the shunt coil 400 invokes a change in the electric field present around the power transmission line, thereby modulating the electric field according to the data to be sent over the line. In other words, micro EMPs can be repeatedly applied to the electric field in a pattern that represents data to be transmitted. The invoked change in the electric field results in the field propagating in a notch spike or a fish wave. The modulation of the electric field has the greatest affect on the outer radius of the electric field.

The modulation of the electric field component can be used to transmit data, such as telecommunications and broadcast video signals, to subscribers of the power distribution network 100, such as the subscribers at the sites 130a–130n.

Figure 6:
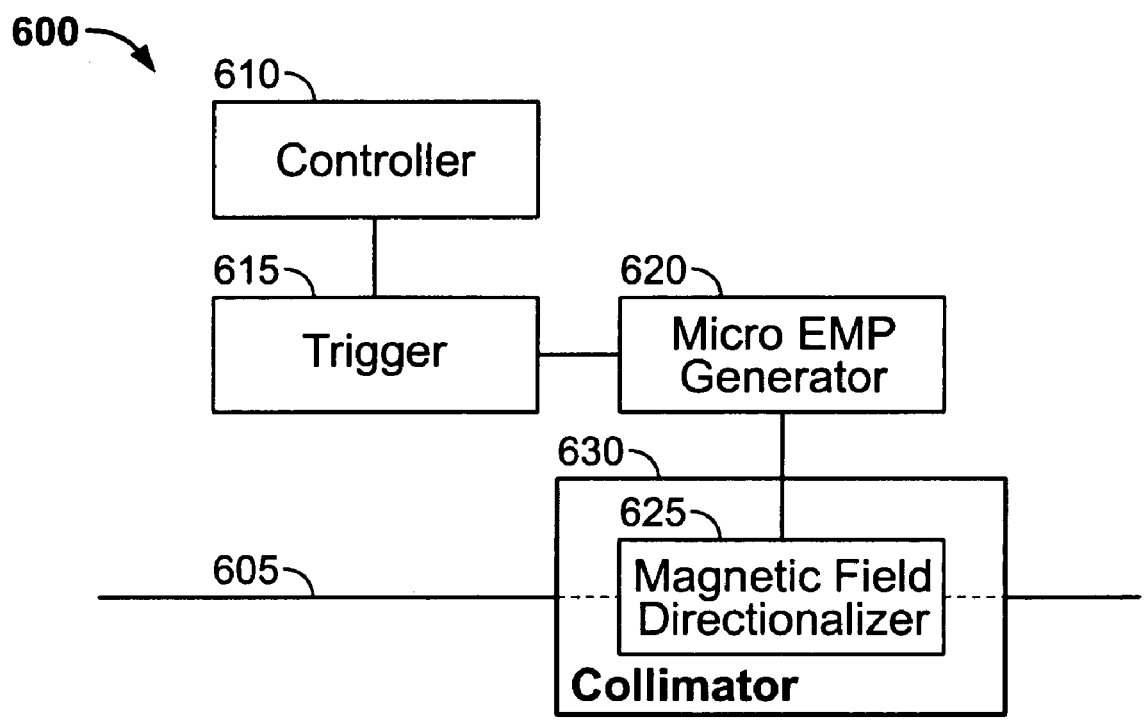
FIG. 6 is a block diagram of a system for modulating the electric field around a power transmission line.

FIG. 6 is a block diagram of a system 600 for modulating the electric field around a power transmission line 605. The system 600 includes a controller 610 for operating a trigger 615. The controller 610 activates and deactivates the trigger 615 in accordance with a data signal to be transmitted. The controller 610 can be implemented as digital electronic circuitry, integrated circuitry, or in computer hardware, firmware, software, or in combinations thereof. The controller 610 can be implemented in a software product (e.g., a computer program product) tangibly embodied in a machine-readable storage device for execution by a programmable processor; and processing operations can be performed by a programmable processor executing one or more software programs that include instructions to perform the described functions by operating on input data and generating output. Each software program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

The trigger 615 controls a micro EMP generator 620, such as the circuit 300 of FIG. 3. Thus, the trigger 615 can control the operation of the switch S1, which in turn functions to control a micro EMP generating circuit. The micro EMP generator 620 is coupled to a magnetic field directionalizer 625 positioned in an electric field of the power transmission line 605 (e.g., by encircling the power transmission line 605). As discussed above, the magnetic field directionalizer 625 serves to create a directional rise in the magnetic field using the micro EMP from the micro EMP generator 620. The magnetic field directionalizer 625 can be implemented as the magnetron head 500 of FIG. 5. The shunt coil 400 of FIG. 4 can be connected to the micro EMP generator 620 and wrapped around the magnetron head 500 to create the directional rise in the magnetic field. The magnetic field directionalizer 625 may be insulated from the power transmission line by an insulator (see FIG. 5) to electrically isolate the system 600 from the power transmission line 605. The magnetic field directionalizer 625 can be positioned in a collimator 630, such as described above, that focuses the magnetic wave created by the magnetic field directionalizer 625 on the atmospheric gases in the vicinity of the power transmission line 605 (e.g., inside the collimator cylinder). This construction causes a hysteresis in the atmospheric gases that modulates the electric field.

The resulting modulation (the notch spike or fish wave) can be detected by detecting the electric field at a location different from where the modulation was performed. The electric field can be detected in any of a number of ways, as will be recognized by those skilled in the art. Because the modulation has the greatest affect on the outer radius of the electric field, demodulation is generally performed on the outer part of the electric field.

Figure 7:
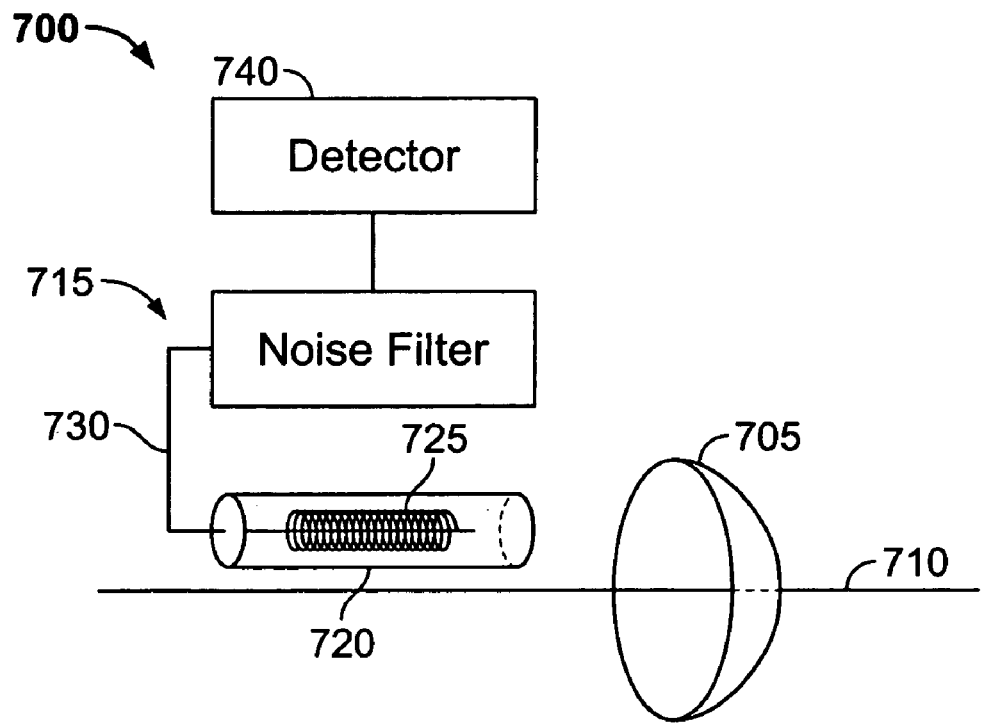
FIG. 7 is an illustration of a demodulation system for detecting the modulated electric field at a location remote from the modulating system of FIG. 6.

One way of detecting the electric field (and changes thereto) entails focusing the electric field and converting the electric field into notch spike or fish wave signals for analysis. FIG. 7 is an illustration of a demodulation system 700 for detecting the modulated electric field at a location remote from the modulating system 600 of FIG. 6. To focus the electric field, a parabolic dish 705 made of heavy PVC clear plastic can be used. The dish 705 becomes charged when the electric field rises due to current on the power transmission line 710. The dish 705 eddies the pool of flowing electric field currents and stalls it in the front of a collimation unit (not shown) where a receiver 715 resides. The collimation unit can be similar to the collimator 630 on the transmission end. The electric field signal currents from the dish 705 are converted to a fish wave or notch spike signal with a gas charged tube 720 vacuumed down to, e.g. 1 ATM, and backfilled with Argon gas. Argon has the following properties: inert; noncombustible; easily ionized by RF energy; creates bridge between electrode and tissue; heavier than air; and displaces nitrogen and oxygen. The inner tube 720 is filled with gold wool 725 to keep the impurities to a minimum. A gold or copper stem or wire 730 extends through the center of the tube 720 and to the outside of the tube 720. The gas charged tube 720 need not be in contact with the power transmission line 710. Instead, the gas charged tube 720 is located in the electric field surrounding the power transmission line 710.

It should be noted that "drift velocities" increase with the impurity of other gases or molecules present in the gas charged tube 720. Quencher gases such as complex $CO_2$ or Iso Butane can cause a drop in photoelectron activity between the metal cathode and the noble stable gasses.

Part of the energy of the incident photon collides with the surface of the gold wool and transverses energy in the form of kinetic energy. Argon (11.6 eV) collides in the excited state with gold (4.82 eV) and an electron is given to the receptor. This eV causes the copper to move to a higher state and the demodulated signal is revealed from the field affecting the argon.

A filter 735 connected to the wire 730 then filters noise in the signal from the gas tube 720. A digital phase/frequency discriminator, such as the AD9901, can be used as a passive phase filter 735. An AD9901 is a digital phase/frequency discriminator capable of directly comparing phase/frequency inputs up to 200 MHz.

The filtered signal is representative of the electric field surrounding the power transmission line 710. By analyzing this signal, any modulation of the electric field can be determined. The filtered signal can be analyzed by a detector 740 that analyzes the waveform output by the noise filter 735 to detect the modulation of the electric field.

Another way of demodulating uses acoustical-optical modulation. The varying electric field of a power transmission line causes a hysteresis of the molecules in the atmospheric gasses around the power transmission line. Acoustical-optical modulation occurs when the electric field excites the molecules and a laser passes through the given field. The molecules diffract the light waves, causing a Doppler shift. By converting the laser to an electrical signal, the shifts and, hence, the electric field, can be detected.

Thus, by passing a conventional laser through the gasses surrounding the power transmission line, converting the laser afterwards to an electrical signal, and filtering the electrical signal, the electrical field component around the power line can be detected. Consequently, any modulation of the electric field by the EMP can be detected.

Figure 8:
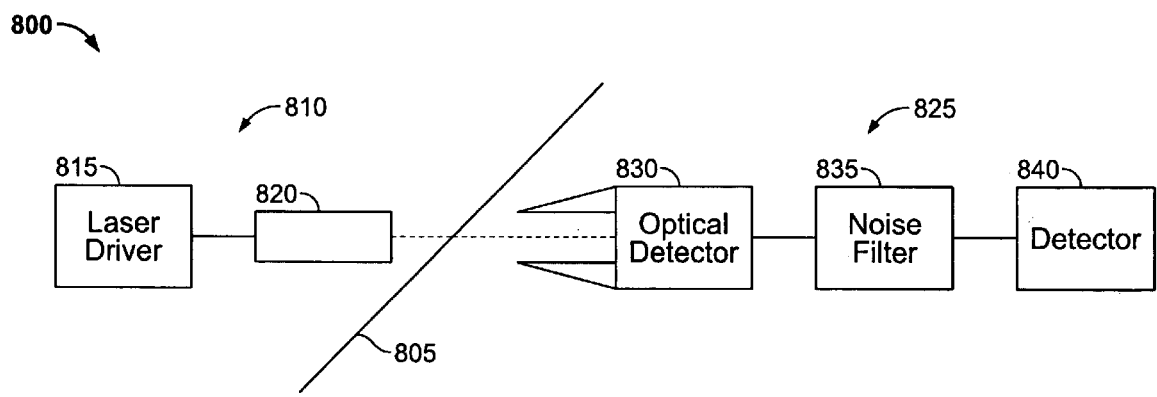
FIG. 8 is an illustration of a laser-based demodulation system for detecting the modulated electric field surrounding a power transmission line at a location remote from the modulating system of FIG. 6.

FIG. 8 is an illustration of a laser-based demodulation system 800 for detecting the modulated electric field surrounding a power transmission line 805 at a location remote from the modulating system 600 of FIG. 6. The laser-based demodulation system 800 includes a laser transmitter 810 that includes a laser driver 815 and a laser 820. The laser driver 815 is a standard laser driver for coherent light lasers. The laser 820 generates a known coherent light that is directed through the atmospheric gases adjacent to the power transmission line 805. The modulation of the electric field surrounding the power transmission line 805 excites the atmospheric gases and creates light deviations through acoustical optical modulation.

The coherent light from the laser 820 is received by a light receiver 825 that includes a conventional optical detector 830, such as a high-speed silicon light detector. The optical detector 830, by detecting the light from the laser 820, generates an electrical signal that is representative of the electric field and that includes changes that are proportional to changes in the electric field surrounding the power transmission line 805. A noise filter 835 connected to the optical detector 830 filters noise in the electrical signal. The noise filter 835 can be of the same type as described above in connection with FIG. 7. The filtered signal is analyzed by a detector 840 that analyzes the waveform output by the noise filter 735 to detect the modulation of the electric field.

A number of implementations have been described. Nevertheless, it will be understood that various modifications may be made. Accordingly, other implementations are within the scope of the following claims.

What is claimed is:

1. A method of transmitting data in a power transmission network that has at least one power transmission line, the power transmission line carrying power in the form of time-varying voltage and current, wherein the time-varying current results in interdependent electric and magnetic field components, the method comprising:
    transmitting data on the power transmission line using micro electromagnetic pulses to modulate the electric field component according to the data.

2. The method of claim 1 wherein transmitting data comprises:
    providing a data signal generator to generate the data; and
    providing a micro electromagnetic pulse generator that generates micro electromagnetic pulses in accordance with the data to be transmitted.

3. The method of claim 2 wherein the electromagnetic pulse generator comprises a tripler circuit.

4. The method of claim 3 further comprising:
    providing a shunt coil connected to an output of the tripler circuit.

5. The method of claim 2 further comprising:
    providing a shunt coil connected to an output of the electromagnetic pulse generator; and
    providing a magnetic field directionalizer, wherein the shunt coil is wrapped around the magnetic field directionalizer.

6. The method of claim 5, wherein the magnetic field directionalizer comprises:
    a first set of washers made of a non-conducting and non-magnetizing material;
    a second set of washers made of a ferroelectric material;
    a rod made of material that acts as a magnetic propagator insulator; and
    wherein the first set of washers are interspersed with the second set of washers on the rod.

7. The method of claim 6 further comprising:
    providing a metallic tube having a polished inner surface; and
    disposing the shunt coil and a portion of the transmission line within the metallic tube.

8. A system for transmitting data in a power distribution network that has at least one power transmission line, the power transmission line carrying power in the form of time-varying voltage and current, wherein the time-varying current results in interdependent electric and magnetic field components, the system comprising:
    a data signal generator to generate data to be transmitted;
    a micro electromagnetic pulse generator that generates electromagnetic pulses in accordance with the data to be transmitted; and
    wherein the electromagnetic pulses are used to modulate the electric field component according to the data.

9. The system of claim 8, wherein the electromagnetic pulse generator comprises a tripler circuit.

10. The system of claim 9 further comprising a shunt coil connected to an output of the tripler circuit.

11. The system of claim 10 further comprising a magnetic field directionalizer, wherein the shunt coil is wrapped around the magnetic field directionalizer.

12. The system of claim 11, wherein the magnetic directionalizer comprises:
    a first set of washers made of a non-conducting and non-magnetizing material;
    a second set of washers made of a ferroelectric material;
    a rod made of material that acts as a magnetic propagator insulator; and wherein the first set of washers are interspersed with the second set of washers on the rod.

13. The system of claim 12 further comprising:
a metallic tube having a polished inner surface; and
wherein the shunt coil and a portion of the transmission line are disposed within the metallic tube.

14. The system of claim 8 further comprising a magnetic field directionalizer coupled to the micro electromagnetic pulse generator, wherein the magnetic field directionalizer induces a polarization leap in the magnetic field component to modulate the electric field component.

15. The system of claim 14 further comprising a collimator adapted to focus the polarization leap in the magnetic field component on an area near the power transmission line.

16. A method for transmitting data in a power transmission network, with the power transmission line carrying power in the form of time-varying voltage and current, the method comprising:
applying an electromagnetic pulse to induce a polarization leap in a magnetic field surrounding the power transmission line; and
detecting a change in an electric field surrounding the power transmission line caused by the polarization leap.

17. The method of claim 16 wherein the change in the electric field is detected at a remote location from a location where the electromagnetic pulse is applied.

18. The method of claim 17 wherein the remote location is at least a mile from the location where the electromagnetic pulse is applied.

19. The method of claim 17 wherein applying the electromagnetic pulse comprises creating a directional rise in the magnetic field.

20. A system for transmitting data in a power transmission network, with the power transmission line carrying power in the form of time-varying voltage and current, the system comprising:
means for generating a micro electromagnetic pulse; and
means for applying the micro electromagnetic pulse to a magnetic field surrounding the power transmission line to create a directional rise in the magnetic field.

21. The system of claim 20 further comprising means for focusing the directional rise in the magnetic field on an area surrounding the power transmission line.

22. The system of claim 20 further comprising means for generating a data signal, wherein the micro electromagnetic pulse is generated in accordance with the data signal.

23. The system of claim 20 further comprising means for insulating the power transmission line from the means for applying the micro electromagnetic pulse.

* * * * *